Oct. 26, 1926.
H. J. KASTNER
1,604,831
LIQUID LEVEL INDICATOR
Filed March 19, 1923
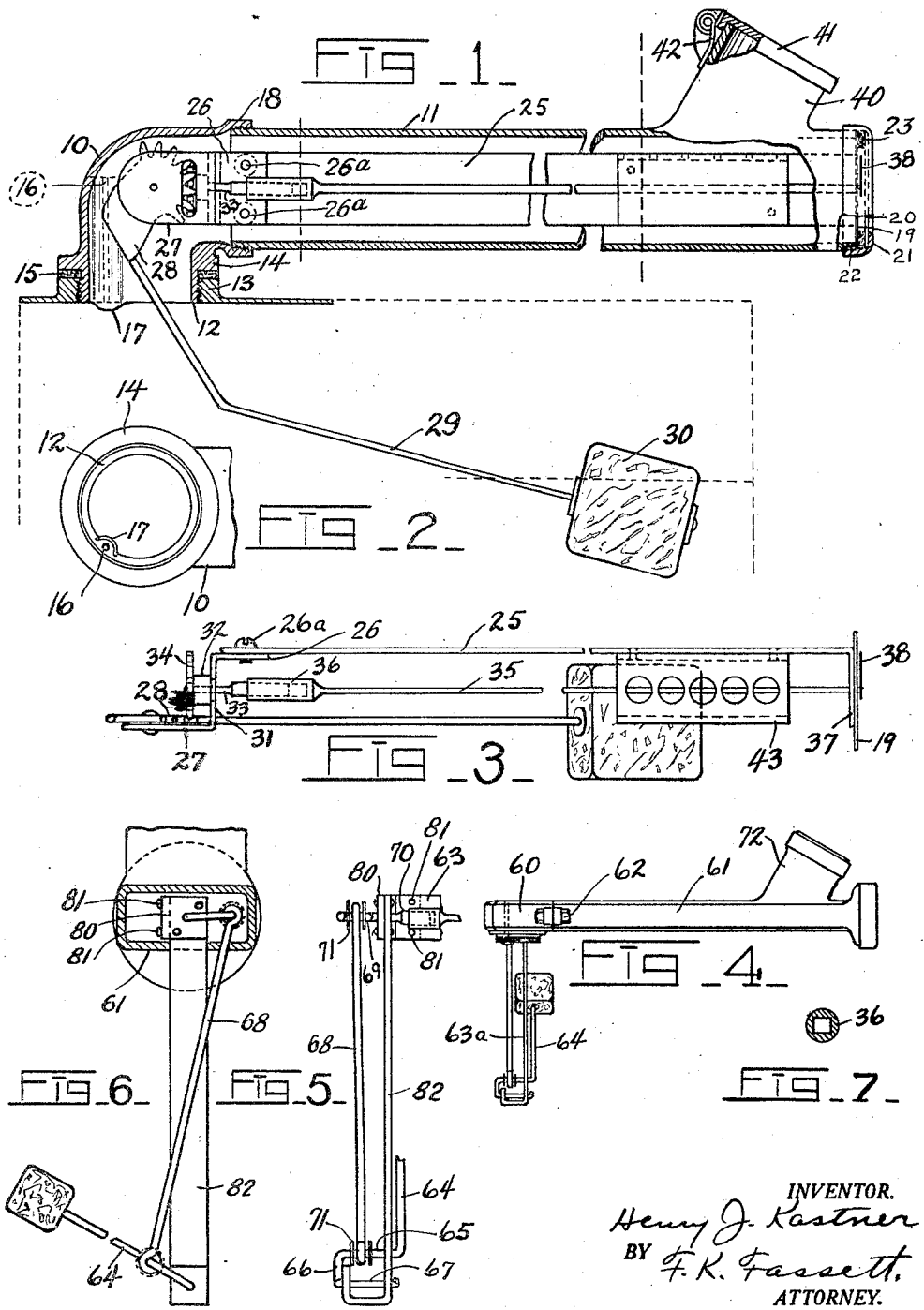
INVENTOR.
Henry J. Kastner,
BY F. K. Fassett.
ATTORNEY.

Patented Oct. 26, 1926.

1,604,831

UNITED STATES PATENT OFFICE.

HENRY J. KASTNER, OF DAYTON, OHIO, ASSIGNOR TO H. G. DARROCH, OF DAYTON, OHIO.

LIQUID-LEVEL INDICATOR.

Application filed March 19, 1923. Serial No. 626,244.

My invention relates to a combined conduit for carrying liquid fuel to a tank and an indicator to show the height of the fuel in the tank. In certain makes of automobiles the fuel tank is under the seat and it is necessary to lift the cushion from the seat to gain access to the opening in the tank. The purpose of my invention is to provide a conduit which can be permanently screwed into the tank collar, said conduit extending laterally under the seat far enough to bring its outer end beyond the cushion, thus enabling the fuel to be poured in at this outer end. Thus removal of the cushion is rendered unnecessary. As cars of the kind referred to are not provided with indicators to show the height of the fuel in the tank, it is customary to plunge a stick into the tank to ascertain the depth of the fuel. As this can no longer be done after the conduit is in place, and as it would be necessary to remove the cushion to do so, nothing would be gained by providing the conduit, unless an indicator were also provided. This I do. My invention therefore comprises the conduit referred to, combined with an indicator.

I have embodied my invention in two forms, which are illustrated in the accompanying drawing, in which, Figure 1 is a vertical sectional view of one form, showing it attached to a fragment of a tank;

Figure 2 is a view, seen from below, of the portion of the conduit which screws into the threaded collar of the tank;

Figure 3 is a plan view of the operating mechanism of the indicator;

Figure 4 is an elevational view of the other form;

Figure 5 is a view of the principal operating parts of the structure shown in Figure 4, shown from the same point of view but somewhat enlarged;

Figure 6 is a similar view of these parts, but seen from a point ninety degrees around; and Figure 7 is a fragmental detail of the socket for connecting the rock-shaft of the indicator to the spindle which rocks the shaft.

I shall first describe the form shown in Figures 1, 2 and 3. The conduit in reality consists of two parts, 10 and 11, but for convenience in describing the device I refer to the part 10 as the coupling member and to the part 11 as the conduit. It is necessary to make the conduit in two parts, in order to screw it into the threaded collar of the tank. If it were in one piece there would not be room for swinging it in a circle as it is screwed into the tank.

The coupling member 10 is provided with a vertical neck 12 to screw into the threaded collar 13 of the tank, and above the neck is a shoulder 14 to abut the upper face of the collar, a suitable packing washer 15 being interposed. The coupling member is provided with a hole 16 to act as a vent, and to prevent the incoming fuel from being drawn to the vent by the current of air which flowed toward the vent. I guard the vent with a depending flange or rib 17. The conduit 11 is connected to the coupling member 10 by screw threads, as at 18, and it is to be noted that the coupling member is in reality an elbow, so that the conduit 11 extends horizontally from it. While I have said that this device is for use under the cushion of the seat, it is deemed unnecessary to show the seat or cushion, as the claims I shall make do not include anything of that kind. The outer end of the conduit is closed by a dial 19 which lies flat against the end of the conduit. Outside of the dial there is a ring 23, made of some material suitable to form a seat for a glass 20, which at the same time forms a space between the dial and glass. The dial, ring and glass are secured to the conduit by a bezel 21, which screws on to the end of the conduit. The dial is kept from turning by a pin 22, driven into the end of the conduit.

The indicating mechanism is mounted on a frame indicated generally by the numeral 25, which lies loosely in the conduit. The frame is made of two pieces, joined at 26 with screws 26ª. One of these pieces, having the form in plan of the letter Z lies in the coupling member 10, and has pivoted to one of its limbs, 27, a segment of a gear 28, to which is connected an arm 29 that hangs down into the tank and at its lower end carries a float 30. Adjoining the member 27 is the member 31, at a right angle, and this member carries a bearing 32 in which a horizontal spindle 33 rotates. At one end this spindle carries a gear 34 which meshes with the segment 28, so that as the arm 29 rises or falls, according to the height of the fuel in the tank, the spindle is rotated one way or the other. The spindle is squared at its other end. A rock-shaft 35 is provided with a socket 36, having a square hole in it (see Fig. 7), which shaft is connected to the spindle by slipping the socket over the squared end of the spindle 33. The other end of the shaft passes through the inturned end 37 of the frame 25, and through the dial 19, and carries an indicating hand 38 on its end. It is to be understood that the end 37 of the frame 25 is not attached to the dial. Thus as the arm rises or falls in the tank the hand 38 moves around the dial, the dial being provided with suitable graduations to show the height of the fuel in the tank according to the position of the hand on the dial.

The frame 25 lies in the conduit, being centered therein by the cross members 31 and 37, which are rectangular. To put the device in place on a tank the conduit must be removed from the coupling member 10. To remove the conduit from the coupling the conduit is unscrewed at 18, the dial 19, glass 20 and bezel 21 simply turning with the conduit as though all were integral with the conduit. As the pointer 38 is confined between the dial and glass the shaft 35 is forced to move endwise with the conduit, but it does not rotate with the conduit as the latter is screwed into or out of the coupling. The two parts of the frame are then separated by removing the screws 26ª. This permits the shaft 35 to be removed from the spindle 33, by simply separating the parts of the slip joint. The coupling member 10 may then be screwed into the collar of the tank, the arm 29 meanwhile hanging down and turning in the tank. This being done, the two parts of the frame 25 are united by the screws 26ª, the frame being already in place in the conduit. While the shaft is practically immovable longitudinally, in the conduit, owing to the pointer 38 being confined between the glass 20 and dial 19, the frame may be slipped part way out of the conduit so as to permit access to the screws 26ª. When these screws have been put in place and tightened, the shaft is coupled to the spindle 33 and then the conduit is screwed into the coupling member. Near its outer end the conduit is provided with an upwardly extending inlet branch 40, having a hinged cover 41, which is normally kept closed by a spring 42. Fuel is poured into the conduit at this inlet. In order to protect the shaft 35 from the nozzle of the filling hose, a perforated guard plate 43 is riveted to the frame 25. This plate has a form approximately like an inverted letter U.

In the modification illustrated in Figs. 4, 5 and 6, the conduit in reality consists of two parts, 60 and 61, but for convenience I shall, as before, refer to the portion which screws into the fuel tank as the coupling (60) and to the other part (61) as the conduit. The coupling 60 and conduit 61 are rectangular in cross-section and they are united by two bolts 62, only one of which is seen in the drawing. A frame comprising a knee 80 and member 63, lies in the conduit 60—61 as and for the same purpose as the frame 25 in Figs. 1 and 3. The knee 80 and member are united by screws 81—81. Secured to the knee by rivets is a depending leg 82, the lower end of which is bent into the shape of the letter U. The float arm 64 is pivotally attached at the lower end of this leg. As is seen in Figs. 4 and 5 the float arm is provided with return bends 65, 66 and 67, the latter passing through holes in the two vertical legs of the U, thus providing the arm with a pivotal attachment which prevents the arm wabbling. The member 65 forms a crank to which the lower end of a pitman 68 is connected. The other end of the pitman is connected to the crank shaped end 69 of a spindle 70, and thus the spindle is rotated back and forth as the arm 64 rises or falls in the tank. In order to prevent displacement of the pitman on the cranks 65 and 69, disks 71 are placed on each side of the pitman and soldered to the cranks. As the other parts of this structure are substantially the same as the corresponding parts of the first structure, the spindle 70 being connected to the indicator shaft by a separate slip joint similar to that shown in Figs. 1 and 3, it is not necessary to describe them in detail. It suffices to say that the portions 60 and 61 of the conduit may be separated to permit the former to be screwed into the tank, removal of the screws 81 and separation of the slip joint 70 effecting the necessary division of the indicating mechanism. The indicator parts have sufficient play in the conduit to permit the assembly of the indicator frame and replacement of the screws 81 before the parts 60 and 61 of the conduit are reconnected. A removable cap is shown on the inlet branch 72 in place of the hinged cap, but these are interchangeable, obviously.

It is now seen that I have not only provided two forms of indirect filling means, together with indicators to show the height of the fuel in the tank, but I have also provided novel means for attaching these devices to the tank. This has heretofore been a serious problem in apparatus of this kind, and I am not aware that anyone else has solved the problem as successfully or in the same way as I have solved it.

What I claim as my invention is as follows:

1. An indicator for a liquid fuel tank, comprising a horizontal spindle, a float adapted to rise and fall as the level of the fuel in the tank rises and falls, means whereby such movements of the float oscillate said spindle, a horizontal rock-shaft, a coupling whereby to connect said spindle to the shaft in longitudinal alignment, a pointer carried by the end of the shaft remote from said coupling, a stationary frame in which the shaft and spindle are journaled and adapted to oscillate as the float rises and falls in the tank, the frame comprising two parts joined at a point contiguous to said shaft coupling, and a tube within which said frame lies loosely, said tube carrying a dial and having a sight opening through which to observe the dial and pointer, the tube comprising two parts joined at a point contiguous to the joint in the frame, thus enabling the assembled structure to be divided into two parts, one part of the tube having a threaded nipple, the axis of which is perpendicular to the axis of said spindle, adapted to screw into a threaded aperture in the tank while the structure is thus divided, the shaft, frame and tube being then connected at their respective joints.

2. An indicator for a liquid fuel tank, comprising a horizontal spindle, a float adapted to rise and fall as the level of the liquid in the tank rises and falls, means whereby such movements of the float oscillate said spindle, a support for the aforesaid parts, adapted by rotation on an axis perpendicular to the spindle to screw into a threaded aperture in the tank, a rock-shaft, a slip-joint coupling whereby to connect the spindle and the shaft in longitudinal alignment, a pointer carried by the end of the shaft remote from the coupling, a supporting structure for said shaft, wherein the shaft is journaled, means for connecting said structure to the above mentioned support, whereby to keep said shaft and spindle in longitudinal alignment, and a dial carried by said shaft supporting structure, with which said pointer cooperates to show the position of the float in the tank.

HENRY J. KASTNER.